W. D. COOLIDGE.
VACUUM TUBE ELECTRODE AND PROCESS OF OPERATING SAME.
APPLICATION FILED SEPT. 7, 1912.

1,157,925.

Patented Oct. 26, 1915.

Witnesses:

Inventor:
William D Coolidge,
by
His Attorney.

UNITED STATES PATENT OFFICE.

WILLIAM D. COOLIDGE, OF SCHENECTADY, NEW YORK, ASSIGNOR TO GENERAL ELECTRIC COMPANY, A CORPORATION OF NEW YORK.

VACUUM-TUBE ELECTRODE AND PROCESS OF OPERATING SAME.

1,157,925.     Specification of Letters Patent.     Patented Oct. 26, 1915.

Application filed September 7, 1912. Serial No. 719,218.

*To all whom it may concern:*

Be it known that I, WILLIAM D. COOLIDGE, a citizen of the United States, residing at Schenectady, in the county of Schenectady and State of New York, have invented certain new and useful Improvements in Vacuum-Tube Electrodes and the Process of Operating the Same, of which the following is a specification.

The present invention relates to the operation and structure of high powered Röntgen or similar vacuum tubes. In apparatus of this nature, large amounts of energy are disengaged in a short time. In order to increase the capacity of the electrode for taking care of this energy, the body of refractory metal, for example, platinum, which serves as a target at the focal spot of the cathode rays, has been placed in heat-conducting relation with a large mass of copper, the function of which is to act as a heat storage reservoir and prevent the temperature of the refractory metal from rising to a point where appreciable evaporization takes place. In case the refractory metal is put in direct contact with the copper, the heat conductivity to the latter is sufficient to cause such a rapid removal of heat that a large portion of the refractory metal is at a low temperature even after the focal spot has been brought to its maximum temperature. In the case of some refractory metals, such as tungsten, the strains due to the unequal temperatures are apt to crack the metal.

The present invention consists in so limiting the heat conductivity between the refractory metal and the heat reservoir that the temperature of the former shall quickly rise to and keep above a certain minimum temperature. This construction is particularly valuable in the case of metals, such as tungsten, which at low temperatures are brittle and therefore likely to be cracked under the influence of the forces of heat expansion incident to the cathode ray bombardment.

Figure 1:
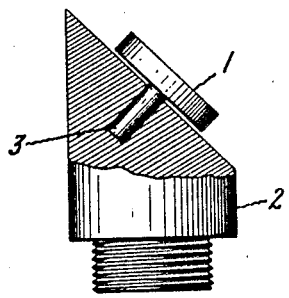
Figure 2:
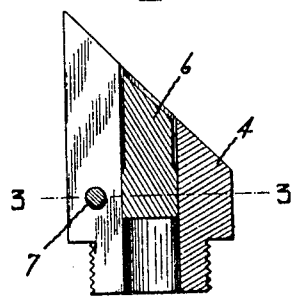
Figure 3:
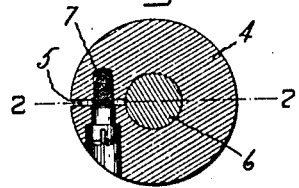

Figure 1 shows partly in section a target or anticathode illustrating one embodiment of my invention; Fig. 2 is a longitudinal section of an alternative structure, and Fig. 3 is a cross-section of the same.

As shown in Fig. 1, a disk, or plate 1, of tungsten, preferably malleable or ductile tungsten, is supported in heat-conveying relation by a stem 3 to a holder 2 consisting of copper, silver or the like. The stem 3 preferably also consists of copper, which can be integrally attached to the tungsten by heating copper in contact with the tungsten in a vacuum to a temperature considerably above the melting point of copper, say 1400° C., as described in my copending application, Serial No. 685,113, filed March 20, 1912.

According to another method, the copper is first degasified by treatment with boron suboxid, or oxidizable boron compound, and then brought in a molten condition into contact with the tungsten. This method as described in my copending application, Serial No. 716,206, filed August 21, 1912, retains the characteristics of wrought tungsten as the tungsten is not overheated. When thus attached by either method, the stem may be trimmed down on a lathe, or in any other way to make a tight fit in the recess in the copper block 2. Its height is adjusted so that a space remains between it and the copper block as indicated.

In some cases it is desirable to surround a body of tungsten with copper or other heat-storing material. Such a construction is illustrated in Fig. 2. In this case, the copper block 4 is tubular, one side of the tube being split at the point marked 5 in Fig. 3. The body of tungsten 6 is clamped in position in the copper block by a screw 7. The manner of holding the body of tungsten is best illustrated in Fig. 3, which is a cross-section on the lines 3, 3 of Fig. 2. In this case the working face of the tungsten body is also separated by a clearance space from the heat storing mass, and the connecting shank is constituted by the section of the tungsten body intermediate between the working face and the clamped surface of said body. In this construction it is obvious that the conduction of heat from the working face of the body of tungsten 6 takes place through a relatively long path, as contact between the tungsten and the copper is made at a point remote from the region where the heat is generated.

When an electrode constructed as above described is suitably mounted as target or anti-cathode in a Röntgen ray tube, the disk of tungsten operates as the active part of the electrode, and, because of a transfer of heat from the tungsten to the copper block through a path of lower heat conductivity than a direct thermal contact immediately adjoining the heated zone, the tungsten body will operate at a fairly high temperature at which the metal possesses a high degree of pliability. This temperature may be as low as 300–400° C. The presence of the large mass of copper with its heat storage capacity will permit the tungsten disk to operate at higher current densities without melting than would otherwise be possible.

At the beginning of the operation, a small amount of current is put through the tube to warm up the target to the required temperature. The current strength may then be increased to the full capacity of the tube, the heat being removed at he required limited rate by the copper as described.

While I have described my invention with reference to a particular form of vacuum tube target, or electrode, I desire it to be understood that it is equally applicable to other forms.

What I claim as new, and desire to secure by Letters Patent of the United States, is:—

1. A Röntgen ray target comprising a mass of metal of good heat conductivity, a tungsten body spaced apart from said mass near the working face of said tungsten body, and a heat conductive connection between said mass of metal and the tungsten body, said connection affording a slower transfer of heat than direct thermal contact between the mass of metal and the tungsten body.

2. An X-ray target comprising a body of refractory metal arranged to receive the cathode rays and a body for receiving and storing heat, said bodies being spaced apart at the discharge-receiving face of the refractory metal body but joined by a shank affording a path of lower heat conductivity than a direct thermal contact between the heat receiving layer of the refractory metal and the heat storing body, so that the tungsten body may be maintained at a high temperature during operation substantially uniform throughout.

3. An X-ray electrode comprising a holder of copper, and a body of malleable tungsten, the copper and tungsten being spaced apart at a region adjoining the working face of the tungsten body, but connected through a shank affording transfer of heat at a rate materially less than a close thermal connection adjoining the heated zone, so that the temperature of the tungsten body may be maintained throughout materially above the temperature of the copper mass.

4. An X-ray target comprising a body of malleable tungsten, a body of copper and a stem of metal smaller in cross-section than said tungsten body connecting said bodies, the tungsten body and copper body being otherwise separated by a space.

5. The method of operating a Röntgen-ray target comprising a refractory metal body which is brittle below a predetermined temperature which consists in first gradually raising the temperature of said body by a small amount of current until it is heated to a temperature at which it is pliable and subsequently operating with a full energy input.

6. The method of operating a tungsten Röntgen tube target which consists in first gradually raising its temperature to a value at which it is pliable, then increasing the input of energy to the normal operating capacity and carrying away heat at a rate proportioned to at least maintain said temperture and sufficient to prevent undue heating.

7. An X-ray target comprising a disk of tungsten, a copper holder, and a stem of metal of materially smaller cross-section than said tungsten and copper holder joining said bodies, said stem affording the sole heat conductive connection between said bodies.

In witness whereof, I have hereunto set my hand this 6th day of September, 1912.

WILLIAM D. COOLIDGE.

Witnesses:
BENJAMIN B. HULL,
HELEN ORFORD.